(12) United States Patent
Liu et al.

(10) Patent No.: US 8,085,130 B2
(45) Date of Patent: Dec. 27, 2011

(54) RADIO FREQUENCY IDENTIFICATION TAG

(75) Inventors: Hsin-Chin Liu, Taipei (TW); Jhih-Guo Peng, Kaohsiung (TW)

(73) Assignee: National Taiwan University of Science and Technology, Taipei (TW)

( * ) Notice: Subject to any disclaimer, the term of this patent is extended or adjusted under 35 U.S.C. 154(b) by 272 days.

(21) Appl. No.: 12/613,533

(22) Filed: Nov. 6, 2009

(65) Prior Publication Data

US 2011/0068901 A1     Mar. 24, 2011

(30) Foreign Application Priority Data

Sep. 18, 2009   (TW) .............................. 98131581 A

(51) Int. Cl.
*H04Q 5/22*     (2006.01)
(52) U.S. Cl. .................................. 340/10.1; 340/10.34
(58) Field of Classification Search ................ 340/10.1, 340/10.33, 10.34, 10.5, 572.1; 235/492
See application file for complete search history.

(56) References Cited

U.S. PATENT DOCUMENTS

| | | | |
|---|---|---|---|
| 5,649,295 A * | 7/1997 | Shober et al. | 340/10.1 |
| 6,184,841 B1 * | 2/2001 | Shober et al. | 343/853 |
| 7,308,249 B2 * | 12/2007 | Rizzo et al. | 455/411 |
| 2005/0174239 A1 * | 8/2005 | Shanks et al. | 340/572.1 |
| 2009/0033469 A1 * | 2/2009 | Seppa | 340/10.3 |
| 2010/0102925 A1 * | 4/2010 | Liu et al. | 340/5.1 |

FOREIGN PATENT DOCUMENTS

| | | |
|---|---|---|
| JP | 2007102621 | 4/2007 |
| TW | 434522 | 5/2001 |
| TW | 452743 | 9/2001 |

* cited by examiner

*Primary Examiner* — Brian Zimmerman
*Assistant Examiner* — An Nguyen
(74) *Attorney, Agent, or Firm* — Jianq Chyun IP Office

(57) ABSTRACT

A battery-assisted radio frequency identification (RFID) tag having a battery-assisted circuit and a filter is provided. The battery-assisted circuit generates a radio frequency signal whose frequency is outside an operating frequency band of the RFID tag to supply additional power to the RFID tag. The filter filters the radio frequency signal output from the battery-assisted circuit before the RFID tag demodulates a reader command, so that a modulation depth of the read command is less affected by multi-carrier. By using the battery-assisted circuit and the filter, the RFID tag has a longer read range and is less affected by multipath fading effects.

14 Claims, 2 Drawing Sheets

RADIO FREQUENCY IDENTIFICATION TAG

CROSS-REFERENCE TO RELATED APPLICATION

This application claims the priority benefit of Taiwan application serial no. 98131581, filed on Sep. 18, 2009. The entirety of the above-mentioned patent application is hereby incorporated by reference herein and made a part of this specification.

BACKGROUND OF THE INVENTION

1. Field of the Invention

The present invention relates to a radio frequency identification (RFID) tag. More particularly, the present invention relates to a batter-assisted tag in accordance with an EPCglobal class 1 generation 2 RFID standard.

2. Description of Related Art

As radio frequency identification (RFID) technique gradually becomes mature, and a price thereof decreases, application of the RFID technique is widespread. For example, a RFID tag is applied to a smart card (a chip card or an integrated circuit (IC) card) for providing convenience and security.

Generally, the RFID tags are mainly grouped into passive, semi-passive and active RFID tags according to different power supplies. The power supply of the passive RFID tag mainly comes from a received RF signal, and after a power of the RF signal converted, an operating power required by the passive RFID tag is provided. According to an EPCglobal standard, the passive RFID tag can be defined as a class-1 or a class-2 RFID tag, the class-1 RFID tag is belonged to an identify tag, and the class-2 RFID tag is belonged to a higher-functionality tag.

The semi-passive RFID tag has a battery for supplying the required operating power. However, the same as the passive RFID tag, the semi-passive RFID tag is belonged to a passive communication and uses a received RF signal as a carrier of a modulated backscatter signal thereof. The semi-passive RFID tag is also referred to as a battery-assisted passive tag, which requires a battery to provide the operating power. However, when the battery is out of power, the semi-passive RFID tag cannot be normally operated.

Since the passive RFID tag does not require the battery, a usage lifespan thereof is longer than that of the active or semi-passive RFID tag. However, since the operating power thereof comes from the RF signal sent by a reader, an effective read distance thereof is relatively short. Meanwhile, due to an influence of a multipath fading effect, a power of the signal received by the passive RFID tag is liable to be less than the required operating power.

Moreover, when the passive RFID tag in a wireless ID system receives a reader command, a demodulator of the RFID tag down-converts the RF signal transmitted by the reader to generate a base band signal for decoding. When the RFID tag decodes the reader command, the signal thereof has to satisfy a demand of a minimum modulation depth that can be correctly interpreted by the RFID tag, so that the RFID tag can correctly decode the reader command. However, in a multi-carrier environment, a minimum amplitude difference required for receiving the reader command limits a performance of the tag read distance.

SUMMARY OF THE INVENTION

The present invention is directed to a radio frequency identification (RFID) tag, in which a passive RFID tag and a battery-assisted circuit are integrated to strengthen a usage distance of the passive RFID tag, and a filter is disposed in front of a demodulator for filtering a signal whose frequency is outside a frequency transmitted by a reader, so that a RFID tag decoding is less affected by multi-carrier.

The present invention provides a RFID tag including a signal port, an antenna, a battery-assisted circuit, a modulator, a power harvester and a filter. The signal port has a first port and a second port. The antenna is coupled to the signal port for receiving a first RF signal transmitted by a RFID reader or other devices and transmitting it to the signal port. The battery-assisted circuit is coupled to the signal port and generates a second RF signal to the signal port, wherein the frequency of the second RF signal is different to that of the first RF signal. The modulator is coupled between a controller and the signal port. The power harvester is coupled between the signal port and the controller for converting a synthesized signal received by the signal port, so as to generate an operating power to the controller, wherein the synthesized signal includes the first RF signal and the second RF signal. The filter is coupled between the signal port and a demodulator for filtering the second RF signal in the synthesized signal and transmitting the filtered synthesized signal to the demodulator. The demodulator down-converts the filtered synthesized signal to generate a base band signal, and transmits it to the controller.

In an embodiment of the present invention, the battery-assisted circuit includes a battery, a voltage-controlled oscillator (VCO) and a transmitting unit. The VCO is coupled to the battery and generates an oscillating signal. The transmitting unit is coupled between the VCO and the signal port for converting the oscillating signal into a first signal and a second signal to form the second RF signal, wherein the second signal is inverted to the first signal.

In an embodiment of the present invention, an operating frequency band of the antenna is between 860 MHz to 960 MHz, and a frequency of the second RF signal is 800 MHz. Moreover, the modulator, the controller, the power harvester, the filter, the demodulator and the signal port are integrated into a RF tag chip, and the battery-assisted circuit can be integrated to the RF tag chip through an external approach.

From another point of view, the present invention provides a signal processing circuit for a RFID tag, which is adapted to be connected to an antenna, and receive a first RF signal through the antenna. The signal processing circuit includes a signal port, a battery-assisted circuit, a modulator, a power harvester and a filter. The signal port has a first port and a second port. The battery-assisted circuit is coupled to the signal port and generates a second RF signal to the signal port, wherein a frequency of the second RF signal is different to that of the first RF signal. The modulator is coupled between a controller and the signal port. The power harvester is coupled between the signal port and the controller for converting a synthesized signal received by the signal port, so as to generate an operating power to the controller, wherein the synthesized signal includes the first RF signal and the second RF signal. The filter is coupled between the signal port and a demodulator for filtering the second RF signal in the synthesized signal and transmitting the filtered synthesized signal to the demodulator. The demodulator down-converts the filtered synthesized signal to generate a base band signal, and transmits it to the controller.

According to the above descriptions, the present invention provides a novel RFID tag, in which the filter is used to filter a RF signal whose frequency is outside a frequency of a reader command of the reader, so that the problem that the reader command cannot be decoded due to inadequate modulation depth thereof can be resolved. Meanwhile, the RFID tag can use carriers of different frequencies to generate extra power, so that a read distance of the RFID tag can be further extended. In addition, a situation of inadequate modulation depth occurred under a multi-carrier environment can be avoided. Therefore, the read distance of the RFID tag can be effectively extended.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
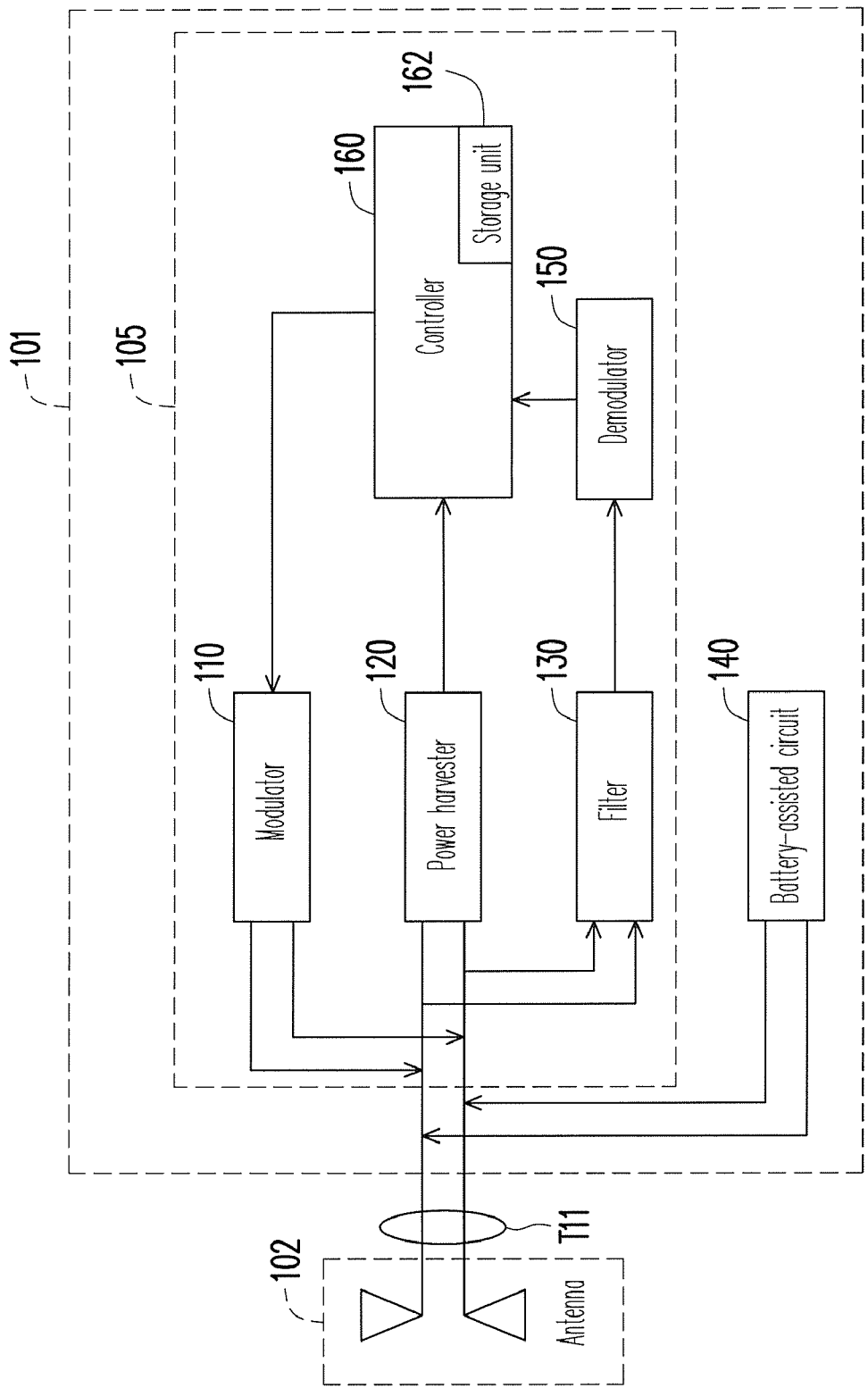
FIG. 1 is a functional block diagram illustrating a radio frequency identification (RFID) tag according to an embodiment of the present invention.

Referring to FIG. 1, FIG. 1 is a functional block diagram illustrating a radio frequency identification (RFID) tag according to an embodiment of the present invention. The RFID tag 100 includes a signal processing circuit 101 and an antenna 102. The signal processing circuit 101 includes a RF tag chip 105 and a battery-assisted circuit 140. The battery-assisted circuit 140 is coupled to a signal port T11 of the RF tag chip 105, and the signal port T11 has two ports. The RF tag chip 105 includes a modulator 110, a power harvester 120, a filter 130, a demodulator 150 and a controller 160. The modulator 110 is coupled between the signal port T11 and the controller 160. The power harvester 120 is coupled between the signal port T11 and the controller 160. The filter 130 is coupled between the demodulator 150 and the signal port T11, and another end of the demodulator 150 is coupled to the controller 160. The battery-assisted circuit 140 is also coupled to the signal port T11, wherein the signal port T11 has a first port and a second port for cooperating signal transmission of the antenna 102. The signal port T11 can be formed by two input/output ports or an input/output port and a ground port, which is determined according to different design requirements, and is not limited by the present invention.

The controller 160 may have a storage unit 162 for storing related setting values. The storage unit 162 is, for example, an electrically erasable and programmable read only memory (EEPROM). Signal transmission (which includes receiving and transmitting of the RF signal) between the RF tag chip 105 and the antenna 102 is performed through the signal port T11. Moreover, when the RF signal is received, impedances of the RF tag chip 105 and the antenna 102 are matched to reduce a loss of the RF signal during transmission. It should be noticed that the RF tag chip 105 can send a signal through the antenna 102 according to a backscatter approach, by which modulated data is transmitted according to a reflection power variation caused by variation of a load impedance of the antenna 102.

When a reader (not shown) sends a reader command, the RFID tag 100 can receive the reader command through the antenna 102. In the present embodiment, the received reader command is represented by a first RF signal. The power harvester 120 converts a power of the received first RF signal into a direct current (DC) operating power, and supplies the DC operating power to an internal circuit (including the controller 160) of the RFID tag 100 for utilization. Generally, the power harvester 120 stores the power of the received RF signal in a capacitor, and the power is provided to the internal circuit through a capacitor discharging. To increase the power converted by the power harvester 120, the battery-assisted circuit 140 can generate another RF signal (i.e. a second RF signal) to the signal port T11, wherein the first RF signal and the second RF signal form a synthesized signal. Since a power of the synthesized signal is greater than that of the first RF signal, the power harvester 120 can obtain a higher power from the synthesized signal, so as to extend a read distance of the RFID tag 100.

In the present embodiment, a frequency of the first RF signal is different to that of the second RF signal. The first RF signal is, for example, 900 MHz, and the second RF signal is, for example, 800 MHz. According to an experiment, it is known that in the RFID tag with the operating frequency of 900 MHz, a charge pump thereof can still be charged by the 800 MHz RF signal, so as to obtain enough power. Generally, the charge pump is disposed in the power harvester 120. Since the frequency of the first RF signal is different to that of the second RF signal, the signal port T11 can generate a multi-carrier synthesized signal, and the multi-carrier synthesized signal can influence a modulation depth of the reader command received by the RF tag chip 105, namely, the modulation depth of the first RF signal is influenced by the second RF signal, and an accuracy of decoding is affected.

In the present embodiment, the reader command sent from the reader is, for example, modulated according to a pulse-interval encoding (PIE) method, and assuming the reader uses an amplitude-shift keying (ASK) modulation technique, a minimum amplitude of the reader command thereof during an OFF state can be influenced by the power of the second RF signal, so that the modulation depth thereof can be inadequate due to the second RF signal output by the battery-assisted circuit 140.

Therefore, the filter 130 filters the signal (i.e. the synthesized signal) received by the signal port T11, so as to filter the signal whose frequency is outside the frequency of the reader command sent by the reader (i.e. the second RF signal is filtered), and then transmits the filtered synthesized signal to the demodulator 150 for demodulating. An operating frequency band of the filter 130 includes an operating frequency band of the reader command, but does not include an operating frequency band of the second RF signal. In the present embodiment, an operating frequency band of the antenna 102 is between 860 MHz and 960 MHz. Since the frequency of the first RF signal is about 900 MHz, and the frequency of the second RF signal is about 800 MHz, the operating frequency band (i.e. a passband) of the filter 130 is higher than 800 MHz, so that the second RF signal is filtered. It should be noticed that the above-mentioned frequencies of the first RF signal and the second RF signal are only used as an example, and the present invention is not limited thereto as long as the frequency band of the filter 130 is correspondingly designed.

Since the filter 130 can filter the signal whose frequency is outside the frequency of the reader command, the second RF signal provided by the battery-assisted circuit 140 can provide more energy to the signal processing circuit 101 without influencing the modulation depth of the first RF signal, and a situation of inadequate modulation depth of the reader command generated due to the multi-carrier can be avoided.

Therefore, in case that the RFID tag 100 obtains higher energy, the read distance of the RFID tag 100 can be further extended.

The demodulator 150 down-converts the filtered synthesized signal to generate a base frequency signal, and transmits it to the controller 160 for decoding and interpreting. Then, the controller 160 responds related data according to a request of the reader. The related data responded by the controller 160 is modulated into the RF signal by the modulator 110, and is transmitted to the reader through the antenna 102. The data can be transmitted through the backscatter approach. The storage unit 162 is used for storing an ID code and chip setting values etc. of the RFID tag 100.

Figure 2:
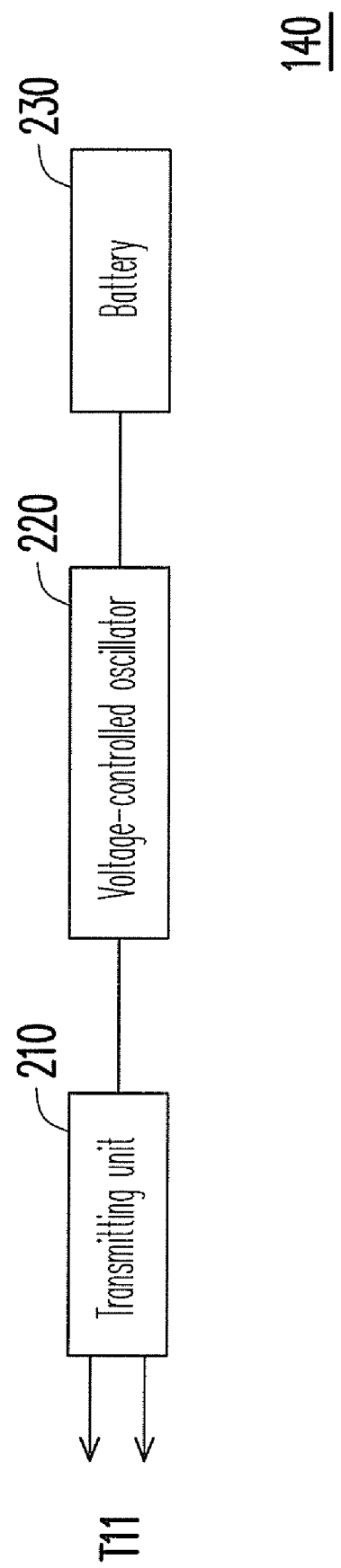
FIG. 2 is a functional block diagram illustrating a battery-assisted circuit 140 according to an embodiment of the present invention.

The battery-assisted circuit 140 is a signal generating device, and a circuit structure thereof is shown in FIG. 2. FIG. 2 is a functional block diagram illustrating the battery-assisted circuit 140 according to an embodiment of the present invention. The battery-assisted circuit 140 includes a battery 230, a voltage-controlled oscillator (VCO) 220 and a transmitting unit 210. The VCO 220 is coupled between the transmitting unit 210 and the battery 230, and the transmitting unit 210 is coupled between the VCO 220 and the signal port T11. The VCO 220 generates an oscillating signal and transmits it to the transmitting unit 210. The transmitting unit 210 converts the oscillating signal into a first signal and a second signal to form the second RF signal, wherein the second signal and the first signal are inverted (have a phase difference of 180 degrees), and then the second RF signal is transmitted to the signal port T11. The transmitting unit 210 is, for example, two transmission paths having different delay time, and the first signal and second signal inverted to the first signal can be generated according to a delay difference of the signal transmission.

Moreover, the following factors are taken into consideration when the battery-assisted circuit 140 is designed. First, the frequency band of the first RF signal is required to be within a collecting band of the power harvester 120. Second, the operating frequency band of the antenna 102 is taken into consideration to avoid a radiation loss. Third, the frequency of the first RF signal and the carrier frequency transmitted by the reader (i.e. the carrier frequency of the first RF signal) cannot be too close, so as to avoid influencing a data decoding. It should be noticed that FIG. 2 is only an embodiment of the present invention, and the circuit structure of the battery-assisted circuit 140 is not limited thereto.

Moreover, regarding a circuit design, the modulator 110, the power harvester 120, the filter 130, the demodulator 150 and the controller 160 can be integrated into a same chip, and a structure thereof is, for example, the same to a situation of adding the filter 130 in a passive RFID tag. The battery-assisted circuit 140 can be designed at external of the passive RFID tag, and a printed circuit board (PCB) battery is used to replace the battery 230 in the battery-assisted circuit 140. Since the battery-assisted circuit 140 of the RFID tag 100 can provide extra RF signals for power conversion, the RFID tag 100 can obtain more power to extend the read distance thereof. Meanwhile, the RFID tag 100 further uses the filter 130 to filter the RF signals provided by the battery-assisted circuit 140, so as to avoid a situation of inadequate modulation depth of the original reader command caused by the multi-carrier. Moreover, the RF tag chip 105 and the battery-assisted circuit 140 can also be integrated in one chip, so that the present invention is not limited to the structure of FIG. 1.

In addition, it should be noticed that when the battery 230 in the battery-assisted circuit 140 is out of power, the RF tag chip 105 in the RFID tag 100 can still be used as the passive RFID tag. Though a read range thereof is shorter, a normal function of the tag is not influenced. In other words, the present embodiment can be regarded as an improvement of the passive RFID tag, which may have a relatively large read distance as that of a semi-passive RFID, and meanwhile has advantages of power-free and low cost as that of the passive RFID.

In summary, the filter is used in the passive RFID tag to filter frequencies outside the frequency of the reader command, so that a problem that the RFID tag cannot decode the reader command due to inadequate modulation depth can be resolved. Moreover, in a multi-carrier environment, since the extra energy provided to the RFID tag does not influence the tag decoding, the extra energy provided to the RFID tag can be increased, so that the read distance of the RFID tag can be further extended.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A radio frequency identification (RFID) tag, comprising:
   a signal port, having a first port and a second port;
   an antenna, coupled to the signal port for receiving a first radio frequency (RF) signal and transmitting the first RF signal to the signal port;
   a battery-assisted circuit, coupled to the signal port, and generating a second RF signal to the signal port, wherein a frequency of the second RF signal is different to that of the first RF signal;
   a modulator, coupled between a controller and the signal port;
   a power harvester, coupled between the signal port and the controller for converting a synthesized signal received by the signal port, so as to generate an operating power to the controller, wherein the synthesized signal comprises the first RF signal and the second RF signal; and
   a filter, coupled between the signal port and a demodulator for filtering the second RF signal in the synthesized signal and transmitting the filtered synthesized signal to the demodulator,
   wherein the demodulator down-converts the filtered synthesized signal to generate a base band signal, and transmits the base band signal to the controller.

2. The RFID tag as claimed in claim 1, wherein the battery-assisted circuit comprises:
   a battery;
   a voltage-controlled oscillator (VCO), coupled to the battery, and generating an oscillating signal; and
   a transmitting unit, coupled between the VCO and the signal port for converting the oscillating signal into a first signal and a second signal to form the second RF signal, wherein the second signal is inverted to the first signal.

3. The RFID tag as claimed in claim 1, wherein an operating frequency band of the antenna is between 860 MHz to 960 MHz.

4. The RFID tag as claimed in claim 1, wherein a frequency of the second RF signal is 800 MHz.

5. The RFID tag as claimed in claim 1, wherein the controller has a storage unit.

6. The RFID tag as claimed in claim 5, wherein the storage unit is an electrically erasable and programmable read only memory (EEPROM).

7. The RFID tag as claimed in claim 1, wherein the modulator, the controller, the power harvester, the filter, the demodulator and the signal port are integrated into a RF tag chip.

8. A signal processing circuit for a RFID tag, adapted to be connected to an antenna and receive a first RF signal through the antenna, the signal processing circuit comprising:
- a signal port, having a first port and a second port;
- a battery-assisted circuit, coupled to the signal port, and generating a second RF signal to the signal port, wherein a frequency of the second RF signal is different to that of the first RF signal;
- a modulator, coupled between a controller and the signal port;
- a power harvester, coupled between the signal port and the controller for converting a synthesized signal received by the signal port, so as to generate an operating power to the controller, wherein the synthesized signal comprises the first RF signal and the second RF signal; and
- a filter, coupled between the signal port and a demodulator for filtering the second RF signal in the synthesized signal and transmitting the filtered synthesized signal to the demodulator,
- wherein the demodulator down-converts the filtered synthesized signal to generate a base band signal, and transmits the base band signal to the controller.

9. The signal processing circuit as claimed in claim 8, wherein the battery-assisted circuit comprises:
- a battery;
- a VCO, coupled to the battery, and generating an oscillating signal; and
- a transmitting unit, coupled between the VCO and the signal port for converting the oscillating signal into a first signal and a second signal to form the second RF signal, wherein the second signal is inverted to the first signal.

10. The signal processing circuit as claimed in claim 8, wherein an operating frequency band of the antenna is between 860 MHz to 960 MHz.

11. The signal processing circuit as claimed in claim 8, wherein a frequency of the second RF signal is 800 MHz.

12. The signal processing circuit as claimed in claim 8, wherein the controller has a storage unit.

13. The signal processing circuit as claimed in claim 12, wherein the storage unit is an EEPROM.

14. The signal processing circuit as claimed in claim 8, wherein the modulator, the controller, the power harvester, the filter, the demodulator and the signal port are integrated into a RF tag chip.

* * * * *